United States Patent [19]

Harrington

[11] Patent Number: 4,521,875

[45] Date of Patent: Jun. 4, 1985

[54] ORIENTATION DETECTION SYSTEM FOR THIN-LINE TOWED SONAR ARRAYS

[75] Inventor: William A. Harrington, Whittier, Calif.

[73] Assignee: Hughes Aircraft Company, El Segundo, Calif.

[21] Appl. No.: 332,999

[22] Filed: Dec. 21, 1981

[51] Int. Cl.³ .......................... G01S 3/80; G01C 17/26
[52] U.S. Cl. .................................. 367/130; 33/363 K; 250/231 SE; 367/19
[58] Field of Search ............... 33/363 K; 250/231 SE; 367/19, 130

[56] References Cited

U.S. PATENT DOCUMENTS

| | | | |
|---|---|---|---|
| 3,577,000 | 5/1971 | Warner | 250/231 SE |
| 3,888,016 | 6/1975 | Fowler | 33/363 K |
| 3,940,609 | 2/1976 | Johnstun | 250/231 SE |
| 3,950,859 | 4/1976 | Kramer | 33/363 K |
| 4,047,168 | 9/1977 | Fowler | 33/363 K |
| 4,064,435 | 12/1977 | Stebbins | 250/231 SE |
| 4,231,111 | 10/1980 | Neeley | 367/19 |
| 4,304,630 | 12/1981 | Tanner | 250/231 SE |
| 4,320,293 | 3/1982 | Guretzky | 250/231 SE |

Primary Examiner—Richard A. Farley
Attorney, Agent, or Firm—William J. Benman, Jr.; Anthony W. Karambelas

[57] ABSTRACT

A thin-line heading sensor is disclosed having an outside diameter of less than an inch which is accurate to within 1° of arc. The invention includes a magnetic wheel having a reflective multifaceted perimeter. The facets are optically coded for identification. When the wheel is illuminated by a collimated beam of light, a beam is reflected onto an array of photodetectors. The photodetectors are coupled with an electronic circuit which decodes the position and pattern of illumination to determine the position of the magnetic wheel.

41 Claims, 12 Drawing Figures

ORIENTATION DETECTION SYSTEM FOR THIN-LINE TOWED SONAR ARRAYS

BACKGROUND OF THE INVENTION

1. Field of the Invention

This invention relates to towed sonar arrays utilized in anti-submarine warfare systems. Specifically, this invention relates to orientation detection systems used on such towed arrays.

While the present invention is described herein with reference to a particular embodiment, it is understood that the invention is not limited thereto. Those having ordinary skill in the art and access to the teachings of this invention will recognize additional embodiments within the scope thereof.

2. Description of the Prior Art

Towed sonar arrays have contributed significantly to the dramatic increase in the state of the art of anti-submarine warfare technology. A towed sonar array is an array of acoustic hydrophones which are towed behind a surface ship at a predetermined depth. The hydrophones are extremely sensitive to acoustic vibration. Each hydrophone provides an electrical signal on receipt of an acoustic signal within its range of detection. An array of such detectors is capable of detecting the direction from which the acoustic signal is emanating. With computer assisted signal processing and two such arrays, a target signal may be extracted from noise and pinpointed as to location.

In order determine the exact location of the signal source, it is desirable for the orientation of the towed array to be known to within 1° of arc. For this purpose, orientation detecting heading sensors have been developed. A heading sensor is essentially a compass that provides an electrical output corresponding to the orientation of the towed array relative to the earth's magnetic field. Such a sensor is produced by the Digicourse Company of Massachussets. It includes a wheel having an axis through its center and an optical coating on its surface. A magnet is mounted on the wheel to cause it to spin in response to the earth's magnetic field. An array of LED's and photodetectors is mounted above and/or below the surface of the wheel to determine its angular position.

This system was effective for early towed sonar array designs. The 2" diameter of the wheel was roughly compatible with the diameter of the hydrophone hoses assemblies. However, the new array design, referred to as the 'thin-line design', utilizes hydrophones that have a smaller outside diameter and are therefore encased in smaller protective hoses. This smaller design would permit the towing ship to travel at a higher speed without damaging the array. This would reduce the vulnerability of the towing vehicle while increasing its maneuverability. It is also anticipated that the thin-line design would be less susceptible to drift.

Unfortunately, the thin-line array design requires the heading sensor to be reduced in diameter from nearly two inches to approximately one-half an inch. Such a reduction in the outside diameter of prior art heading sensors would amount to a 15:1 decrease in wheel surface area. It is therefore believed to be virtually impossible to provide a heading sensor accurate to within 1° of arc with the design.

Thus, there is a need for a heading sensor which has a diameter of less than 1 inch, preferably ½ an inch, and which can provide electrical signals corresponding to a compass heading accurate to within 1° of arc.

SUMMARY OF THE INVENTION

The present invention provides an thin-line heading sensor having an outside diameter of less than an inch which is accurate to within 1° of arc. The invention includes a magnetic wheel having a reflective multifaceted perimeter. The facets are optically coded for identification. When the wheel is illuminated by a collimated beam of light, a beam is reflected onto an array of photodetectors. The photodetectors are coupled to an electronic circuit which decodes the position and pattern of illumination to determine the position of the magnetic wheel.

BRIEF DESCRIPTION OF THE DRAWINGS

FIG. 4 shows the details of the opto-electronic hybrid used in the preferred embodiment of the present invention.

DETAILED DESCRIPTION OF THE INVENTION

Figure 1:
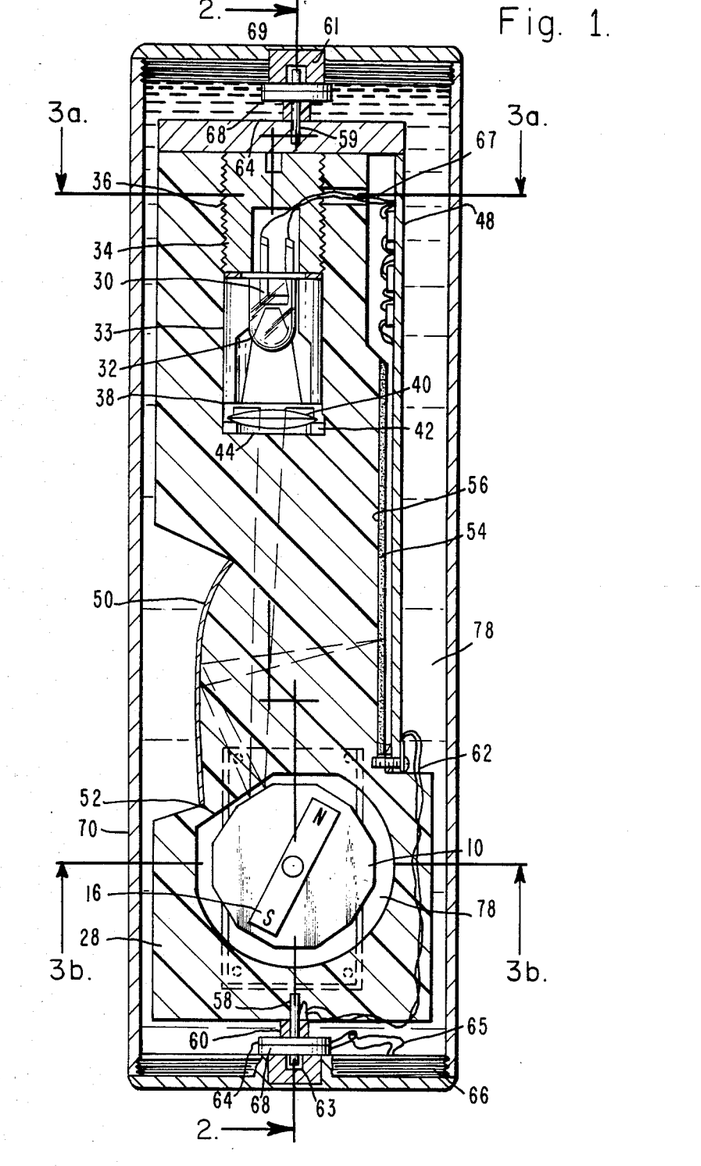
FIG. 1 is a top cross sectional view of the preferred embodiment of the present invention.

The small but highly accurate heading sensor of the present invention is shown in the top view of FIG. 1. As discussed more fully below, the system includes a magnetic wheel having a plurality of reflective facets about its perimeter. The wheel is mounted in optical alignment with a source of collimated light energy such that a beam of light is reflected by one or more of the facets onto an array of photodetectors. The invention includes electronic circuitry which decodes the illumination pattern and provides electrical signals corresponding to the heading of the magnetic wheel. With the exception of a few electronic components, the invention is packaged within a container less than 1 inch in diameter. The additional components are packaged in a heading local control unit (LCU) which is far enough from the heading sensor (i.e., 5 feet) to insure that it does not distort the reading.

THE ASSEMBLY

Figure 2:
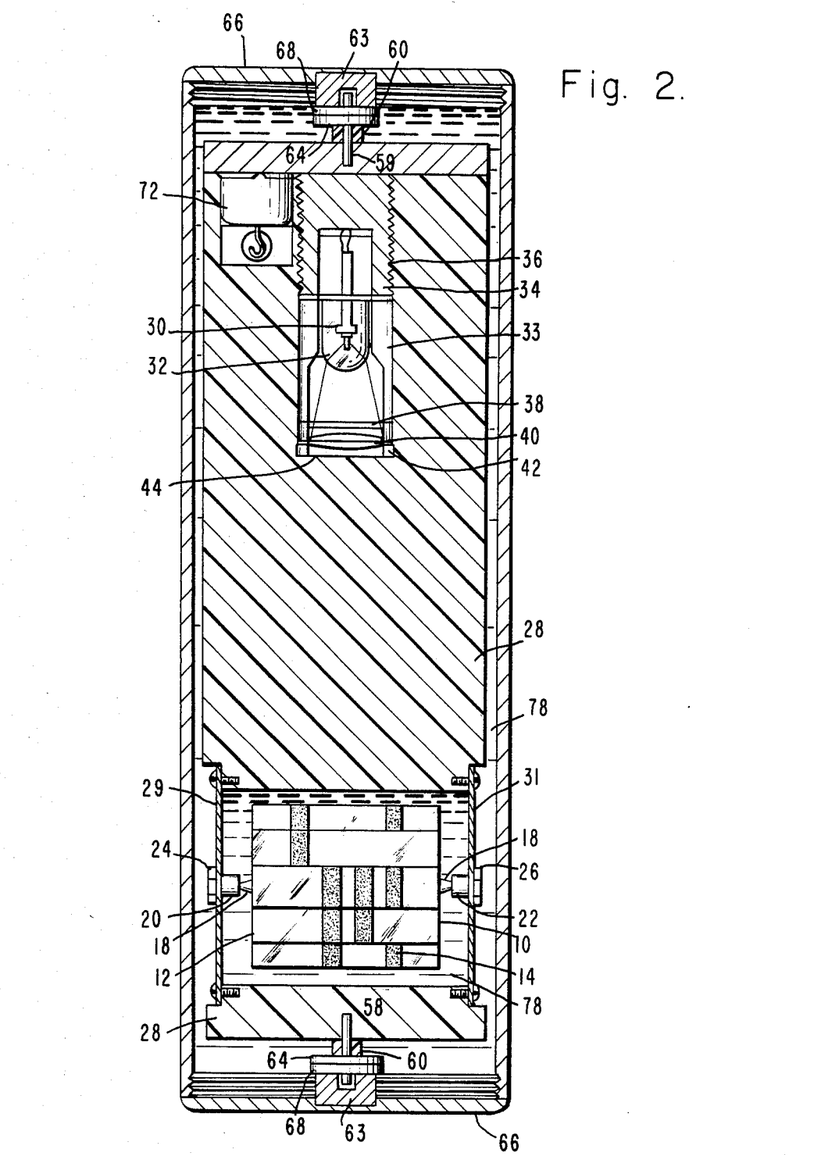
FIG. 2 is a side cross sectional view of the preferred embodiment of the present invention.

The top cross sectional view of FIG. 1 and the side cross sectional view of FIG. 2 clearly illustrate the preferred embodiment of the present invention. The internal assembly includes a mirrored reflective magnetic wheel 10. The wheel 10 may be constructed of glass, plastic, metal or other suitable material. In the preferred embodiment, the wheel 10 is approximately 0.35 inches in diameter and 0.40 inches in height. The wheel 10 has 12 planar reflective facets about its perimeter 12. Each facet is uniquely masked with a coded nonreflective pattern 14 for identification. A dipole samarium cobalt magnet 16 is embedded in the wheel 10. Extending from the common axis of the wheel 10 and the magnet 16 are jeweled bearings 18. The spindle 18 mounts in bearing seats 20 and 22 which are held in place by bolts 24 and 26 respectively. The wheel 10 is held in place in a clear plastic (i.e. lucite) cylinder 28 by top and bottom cover plates 29 and 31 respectively. In the preferred embodiment, the cavity is filled with mineral oil to stabilize the wheel 10.

A light emitting diode (LED) 30 is mounted at the distant end of the cylinder 28. A pair of wires 46 extend from the rear of the LED 30 to the electronic circuitry on the hybrid 48. The light emitting diode 30 is centered within a threaded collar 34 which engages threads 36 in the cylinder 28. The light emitting diode 30 is encased within a glass envelope 32 which in turn is encased within a sleeve 33. The sleeve 33 surrounds a slit aperture 38 through which light from the LED 30 passes and engages a lens 40. The lens 40 is held in place in the sleeve 33 by a retainer 42. The sleeve 33 is bounded by a polished window 44.

Light exits the lens 40 as a thin collimated vertically oriented (knife-edge) beam. This beam passes through the cylinder 28 and the mineral oil 78 to impinge on a facet 12 or the wheel 10. The LED assembly 30-44 is offset relative to the wheel 10 so that the beam is reflected to a mirrored surface 50 through a polished window 52. See FIG. 3c. The mirror 50 has a semiparobolic curvature to ensure that the beam is reflected from the wheel 10 to the target array of photodetectors 54 on the hybrid 48 when a facet 12 moves through the illumination range.

As discussed more fully below, the hybrid 48 includes electronic circuitry and the array of photodetectors 54. The hybrid 48 is mounted on the cylinder 28 behind a polished window 56.

The cylinder 28 has a spindle at each end. See FIGS. 1 and 2. The cylinder 28 may be made of other suitable materials without departing from the scope of this invention. The cylinder 28 and the hybrid 48 provide an internal assembly which is suspended within the container 70 by spindles 58 and 59. The spindles 58 and 59 rest in seats 61 and 63 which may include jeweled bearings. The spindle 58 at the lower end of the cylinder 28 makes electrical contact with a wire 62 extending from the hybrid 48. A teflon collar 60 separates the cylinder 28 from a washer 64. A wire 65 is attached to the washer 64 and extends through the metal end cap 66 for connection to circuit 500 on the heading local control unit. An insulator 68 is mounted between the washer 64 and the metal end cap 66. A similar arrangement is at the top of the assembly to provide a ground connection through line 69.

The metal end cap 66 is threadably engaged with the metal container 70. The container 70 should be of nonferrous material; preferrably stainless steel.

Figure 3A:
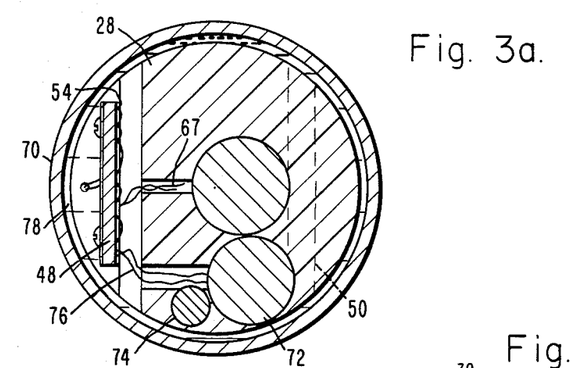
FIGS. 3a and 3b show cross sectional end views of the preferred embodiment of the present invention. The front view is shown in FIG. 3a, the aft view is shown in FIG. 3b.

As shown in the end view of FIG. 3a, a filter capacitor 72 is mounted within the cavity of the cylinder 28. In addition, a lead counter-weight 74 is mounted within the cavity. The filter capacitor 72 and the lead counter weight 74 are mounted in relative proximity so that their combined weights act to cause the cylinder 28 to rotate so that the wheel 10 is in the upright position of FIG. 1.

Figure 3B:
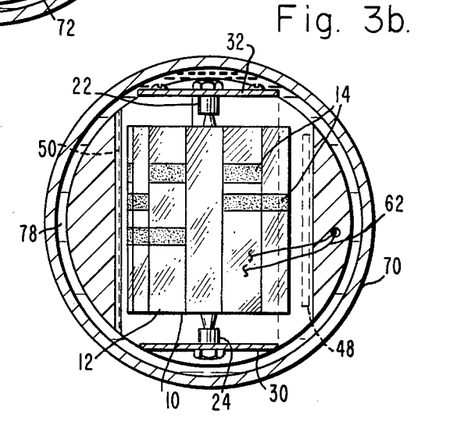
Figure 3C:
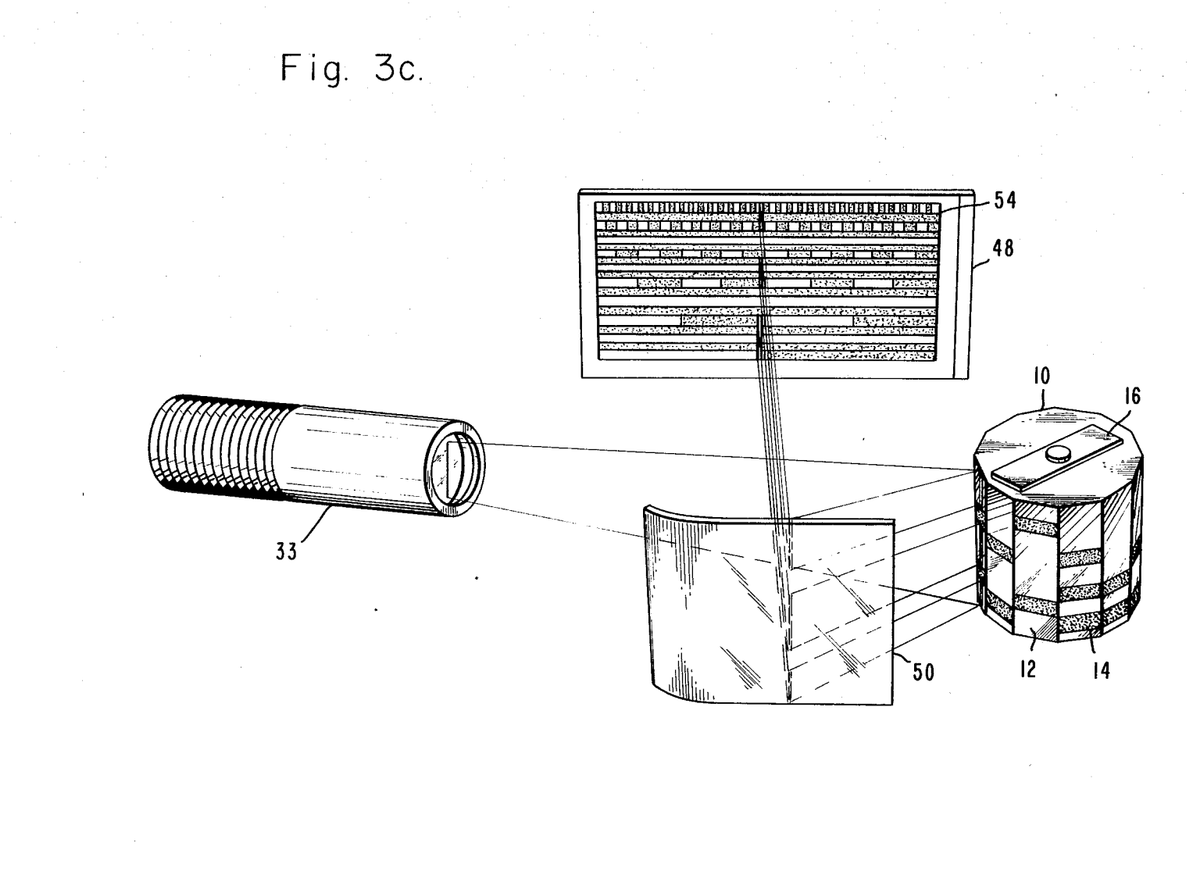
FIG. 3c is an illustrative partial view of the present invention in disassembled relation.

A view of the assembly from the opposite end is shown in FIG. 3b. Note that the space between the cylinder 28 and the container 70 is filled with mineral oil 78 to further enhance the responsivity of the system to gravity, for damping, for dielectric isolation, and to maintain even hydrostatic pressure at the depth of operation. As a result, no pressure isolation is required. Ideally, the specific gravity of the internal assembly should be as close to that of the fluid 78 as possible so that the cylinder will float therein.

THE HYBRID

Figure 4A:
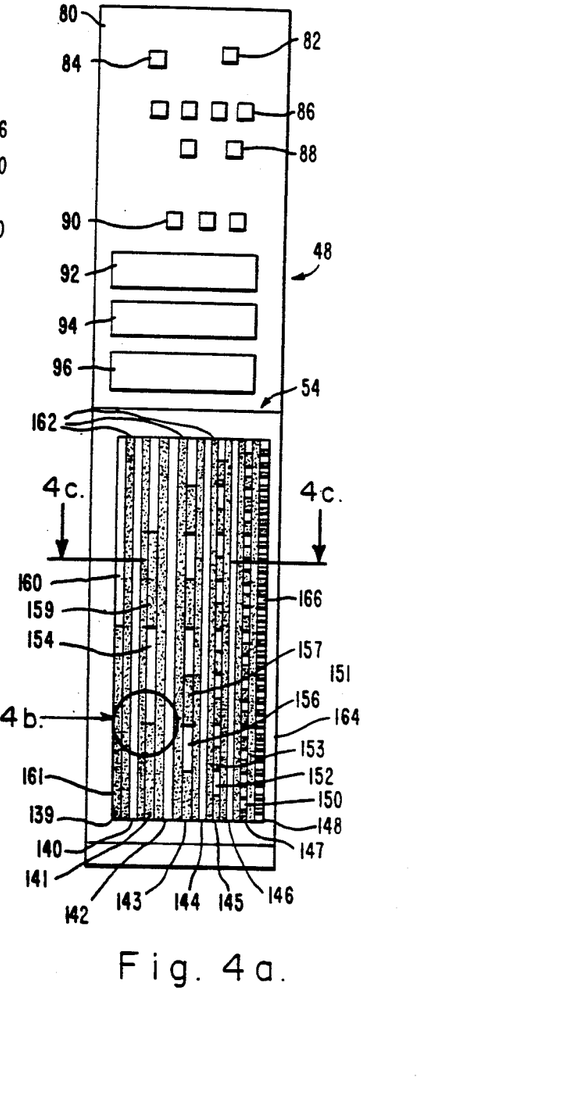
FIG. 4a is a top view of the hybrid.

A front view of the hybrid 48 is shown in FIG. 4a. It includes a ceramic substrate 80 on which a plurality of integrated circuits are disposed on one end and an array of photoconductors 54 on the other end. Areas are provided for a diode 82, a regulator 84, transistors 86, one shots 88, counters 90, read only memory 92, threshold detector and regulator 94 and amplifiers 96. The corresponding electrical circuits will be discussed in further detail below.

The array of photodetectors 54, includes a number or thin-film conductors 100 which are over coated with a layer of cadmium sulfide 110. See FIG. 4c. The cadmium sulfide 110 provides the photoresistor between the thin-film conductors 100. To reduce manufacturing costs, the cadmium sulfide layer may be applied to the entire surface and subsequently selectively masked to provide the pattern shown in FIG. 4a. Any appropriate light blocking material may be used for masking. While it is understood that instead of selectively masking, one can selectively lay down the cadmium sulfide coating, the described approach is preferred because the resistive characteristics of the cadmium sulfide beneath the masked areas provide a reference for the unmasked areas. This helps to provide both thermal and acoustic stability while increasing the sensitivity of the photodetector array. As shown in the cross-sectional view of FIG. 4c, the entire target 54 has a protective overcoat or seal of suitably transparent plastic (G. Paralyne) 128. This seal is to prevent contamination of the cadmium sulfide photodetectors.

Figure 4B:
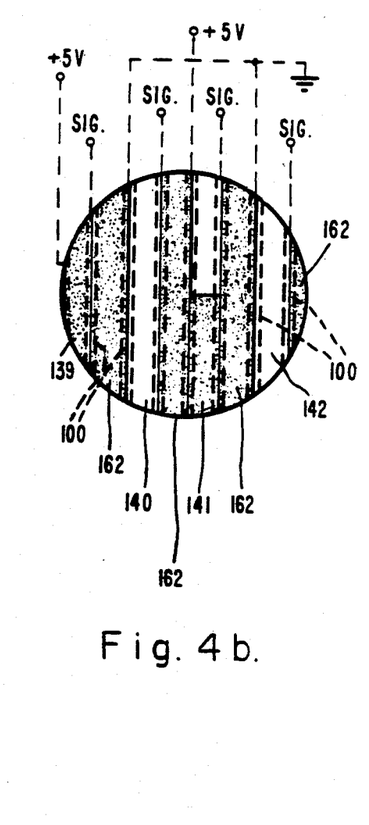
FIG. 4b is a magnified view of a section of the photodetector array of the hybrid.
Figure 4C:
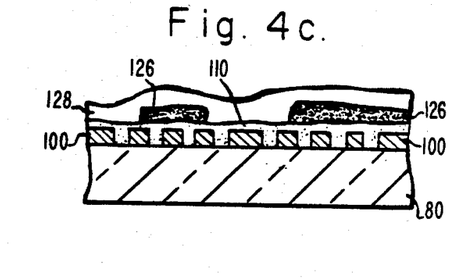
FIG. 4c is a cross sectional end view of the photodetector array of the hybrid.

The cadmium sulfide overcoat is selectively masked at 126 in FIG. 4c to provide three functions. The first is the identification of the facet which is reflecting light. With 12 facets covering a 360° range, each uniquely masked facet may be electronically correlated to the position of the wheel 10 to within 30° of arc. The unmasked strips 140, 142, 144 and 146 provide means for identifing the illuminated facet. Each facet is selectively masked with a unique pattern which determines whether or not light will be reflected onto the strips 140, 142, 144 and 146. For example, the first facet may be identified by masking in all four positions. This could correspond to an electrical binary signal of four consecutive zeros or 0000. The next facet may have three dark areas and one unmasked area such that the strip 140 receives illumination while strips 142, 144 and 146 do not. This could correspond to a binary code of 0001 which identifies the second facet. The masking of each of the remaining ten facets according to this binary scheme allows the electronic circuitry discussed below to identify which facet is being illuminated and therefore calculate the position of the wheel 10 within 30° of arc. Obviously, the invention is not limited to this or any other masking pattern.

The second function of the masking is to permit the array and the associated electronics to identify the position of the wheel to within an accuracy of 1°. This is accomplished by strips 139, 141, 143, 145 and 147. These five strips have masking patterns which correlate to five digits of binary data. At the right side of FIG. 4a which corresponds to the lower end of the target, all of these strips are masked. This corresponds with a binary code of 00000. Assuming the wheel rotates such that the illumination remains on the facet, the image would move on the target photodetector array 54 from right to left. As a result, it would first illuminate the exposed (light) area on the least significant bit strip 147 of the array 54. This corresponds to a binary code of 00001. As the image moves further left, it impinges on a masked (dark) area on strip 147 and an exposed area on strip 145. This corresponds to a binary code of 00010 or 2°. As the image continues to move throughout the range from 0° to 30° the exposed areas on strips 139, 141, 143, 145 and 147 are illuminated. The construction of the thin film conductors 100 is such that as these areas are illuminated they provide electrical signals which represent the position of the line image. This information coupled with the facet indentification information is sufficient to identify both the 30° range within which the compass is pointing and the position of the compass to within 1° of accuracy. Again, the invention is not limited to the masking pattern.

The third function provided by the array 54 is to minimize jitter in the reading. Strip 148 contains a series of exposed areas having a width that is narrower than that of the exposed area in the least significant bit strip 147. In effect it is a "sweet spot" detector which has a corresponding register in the electronic circuit discussed below. The register signals the circuit to hold the previous data until the line image moves to the center of a sensitive area.

FIG. 4b is a magnified view of a section of the array 54 showing the exposed and masked areas and the thin-film conductors. Each of the thin-film conductors 100 is connected to either +5 volts supply, or ground (GND) or provide an output signal (SIG). FIG. 4b shows a portion of facet identification strips 142 and 140 and position determination strips 141 and 139. The reference resistors 162 between the photosensitive strips are formed by selective masking of the cadmium sulfide 110 and the thin film conductors 100. See FIG. 4c.

THE ELECTRONICS

Figure 6A:
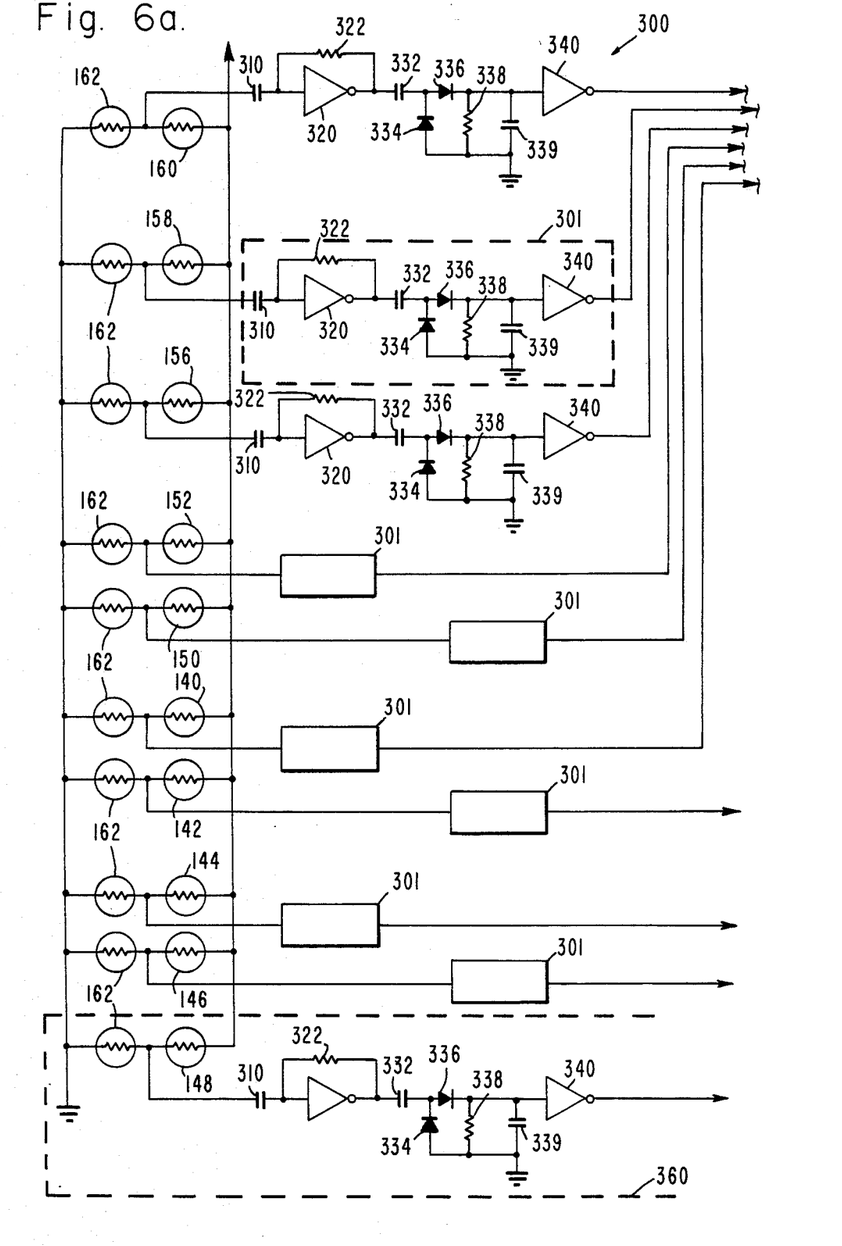
FIG. 6 is a schematic diagram of the electronic circuitry of the present invention.
Figure 6B:
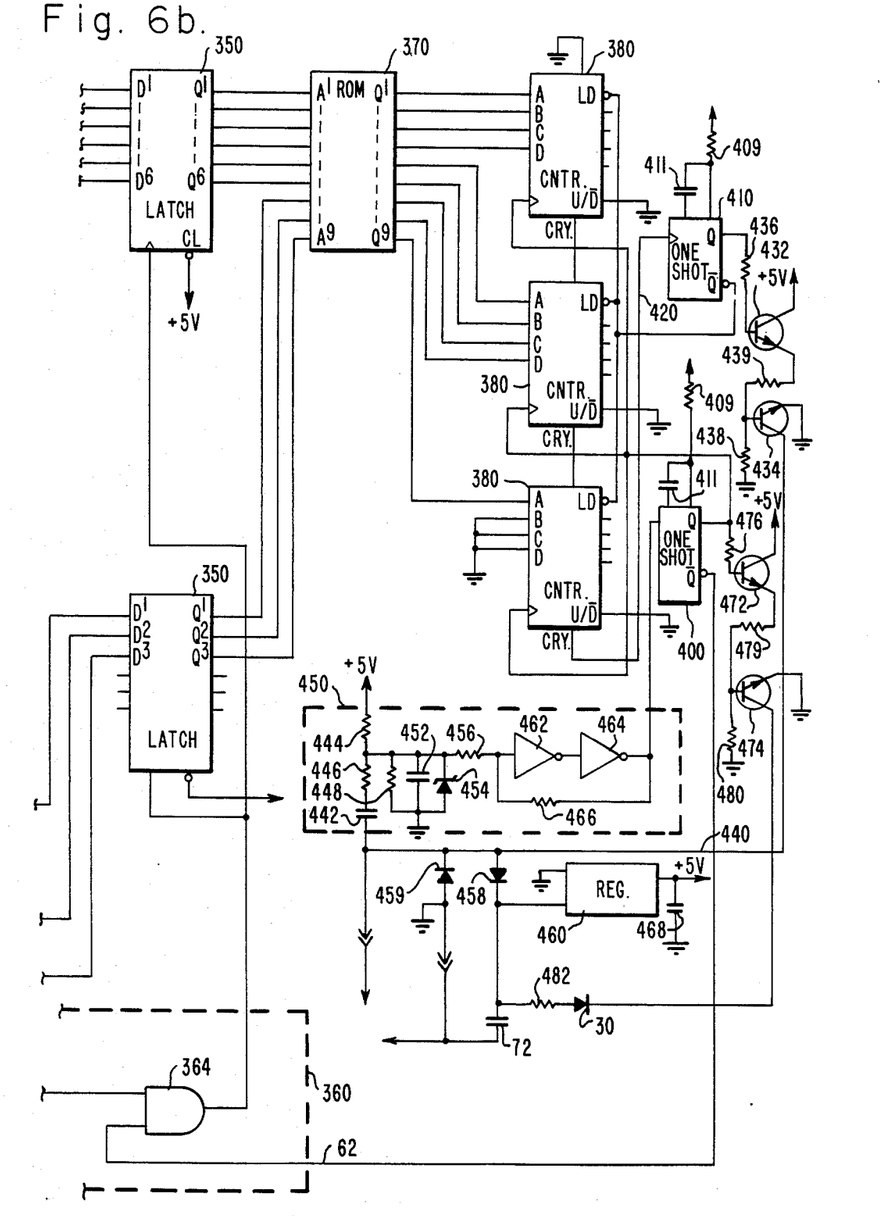
Figure 7:
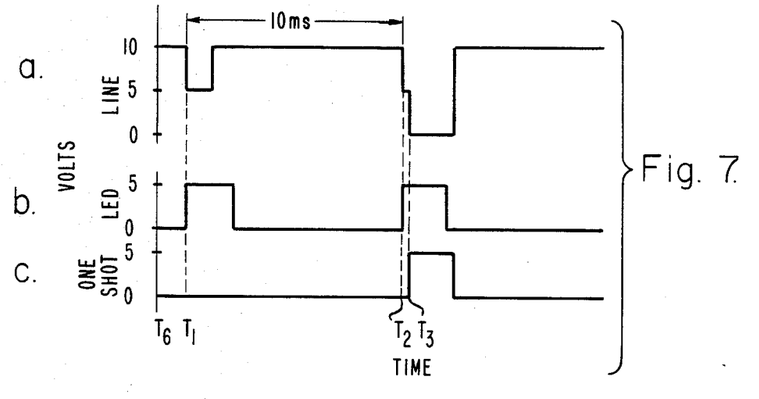
FIG. 7 is a timing diagram for the electronic circuitry of the present invention.

FIG. 7 is a functional block diagram of circuitry which decodes the illumination pattern on the photodetector array 54 and provides an electrical signal corresponding to the position of the wheel 10 relative to the light emitting diode 30. The circuit has two portions 300 and 500 which are joined by a line having two parts 62 and 65. The components located in section 300 are contained within the heading sensor of FIG. 1 while the additional circuitry 500 is located on the heading local control unit (not shown) which is mounted elsewhere on the towed sonar array. The subcircuit 300 is substantially mounted on the hybrid 48. A detailed schematic diagram of the subcircuit 300 is shown in FIGS. 6a and 6b. It includes 10 identical voltage sensing circuits 301, each having a coupling capacitor 310, an amplifier 320, a voltage doubler 330 and a threshold detector 340. Each amplifier 320 has a feedback resistor 322. The voltage doubler 330 includes a capacitor 332, diodes 334 and 336, resistor 338 and capacitor 339. Inputs to the voltage sensing circuits are provided through the exposed areas of cadmium sulfide denoted at 148, 146, 144, 142, 140, 150, 152, 156, 158 and 160. Each is coupled to a reference resistor 162. The outputs of nine of the ten voltage sensing circuits are stored in a latch 350. The output of the 10th voltage sensing circuit is fed through amplifier 362 into an AND gate 364.

Figure 5:
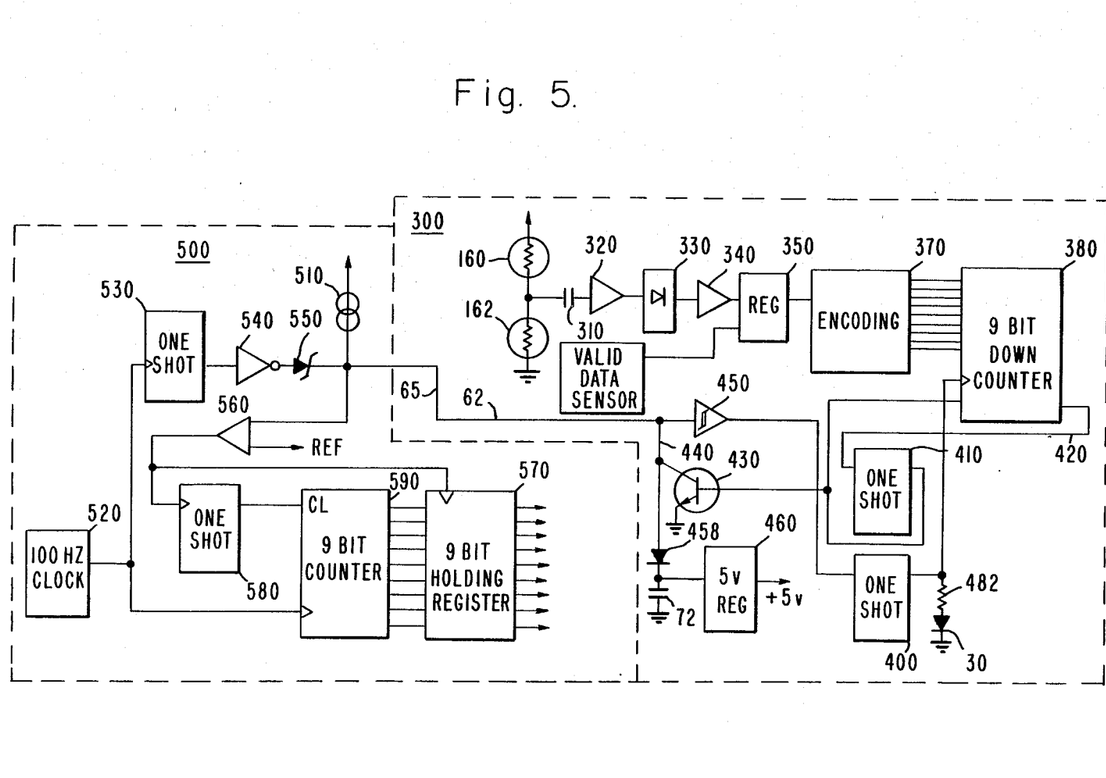
FIG. 5 is a functional block diagram of the electronic circuitry of the present invention.

The latch 350 is shown in two parts in FIG. 6. The latch 350 has parallel inputs and parallel outputs. The outputs of the latch 350 are provided as inputs to an encoding read only memory (ROM) 370. The parallel outputs of the ROM 370 are stored in a nine bit countdown counter 380. The countdown counter in the preferred embodiment is implemented using three off the shelf integrated circuit (IC) packages. (It is understood that a single IC may be used without departing from the scope of the invention.) Clock pulses are applied to the counter 380 via one shot 400. The counter is instructed to load a new count by a pulse from a second one shot 410. The output from the counter 380 appears on line 420 and is input to one shot 410. The output of the one shot 410 also triggers a clamp 430. See FIG. 5. As shown in the detailed schematic of FIG. 6b, the clamp 430 includes transistors 432 and 434 which are biased by resistors 436 and 438 respectively. The transistors 432 and 434 are coupled through a single resistor 439. The clamp output appears on line 440 as an input to a threshold detector 450 and a regulator 460 via diode 458. The threshold detector 450 includes a capacitor 442, a voltage dividing network including resistors 444, 446, and 448; a capacitor 452; a zener breakdown diode 454; and resistor 456. Also included in the threshold detector 450 are two amplifiers 462 and 464 and a feedback resistor 466. The threshold detector 450 is designed for hysterisis to minimize noise on the line 62.

The voltage regulator 460 provides power to the hybrid 48. The voltage regulator 460 has the filter capacitor 72 across its input and a capacitor 468 across its output. As shown in the detailed schematic of FIG. 6, a reverse voltage spike protecting diode 459 is also provided between line 440 and ground. The 'Q' output of the one shot 400 is amplified by transistor pair 472 and 474 and used as the power supply for the light emitting diode 30.

Located on the heading local control unit subcircuit 500 is a current source 510 which provides power for circuit 300. The circuit 500 also includes a clock 520, the output of which is shaped by a one shot 530 and a 5 volt clamp including an open collector driver 540 and a zener breakdown diode 550. The voltage on line 65 is sensed and compared to a three volt reference potential by a comparator 560. The output of the comparator 560 provides an enabling pulse to a latch 570 and an input to a one shot 580. The output of the one shot signals the nine bit up-counter 590 to hold its count. The up-counter 590 is strobed by the output of the clock 520.

OPERATION

The heading sensor is calibrated by making small adjustments in the hybrid position with the internal assembly oriented in a known direction. In operation and in reference to FIGS. 1–3c, the magnet 16 on the wheel 10 responds to the earth's magnetic field and causes the wheel 10 to rotate to the point where the south pole of the magnet is pointed toward the north pole of the earth's magnetic field. A pulsating beam of light is emitted by the light emitting diode 30 and collimated by the lens 40. The beam impinges on a reflective facet 12 of the wheel and is reflected to the photosensitive array 54 by the semiparabolic curved mirror 50.

The masking pattern on the facet 12 is impressed on the array 54 at a position determined by the exact location of the wheel 10. The exposed areas of cadmium sulfide on the photodetector array 54 illuminated by the reflected beam change resistance and thereby provide voltage signals into some of the 10 voltage sensing circuits. See FIGS. 5 and 6. When the line image strikes a valid data sensor and when a clock pulse is received, AND gate 364 provides an enabling pulse to the latch 350. The latch 350 holds a binary code corresponding to the photodetector illuminated. This code is decoded by the ROM 370 to provide at its parallel outputs a count which corresponds to the pointing angle of the wheel 10. The count is stored in the nine bit down-counter 380.

As the clock 520 on circuit 500 pulses, the pulses are provided on line 62 through the threshold detector 450 to the one shot 400. Through the one shot 400, the clock 520 strobes the nine bit down-counter 380 while it simultaneously strobes the nine bit up-counter 590. Thus, as the down-counter 380 counts down, the up-counter 590 counts up. When the down-counter 380 counts down to zero a borrow pulse appears on line 420 as an input to one shot 410. The output of the one shot 410 provides an input to the clamp 30 which clamps the voltage (i.e., 10 volts) on line 62 momentarily to zero volts. See the timing diagram of FIG. 7.

When the zero volt pulse is received on line 62 the comparator 560 output goes high. This latches register 570 to hold the current count in the up-counter 590. The comparator 560 also triggers the one shot 580 which provides a clear pulse to the nine bit counter 590. Thus the count has been transferred to from the nine bit down counter 380 to the nine bit up counter 570. The data corresponding to the compass heading now appears on the parallel output lines of the latch 570.

The timing diagram of FIG. 7 illustrates this operation. FIG. 7a shows the voltage on line 62. FIG. 7b shows the voltage drive for LED 30. FIG. 7c shows the output of the one shot 410.

As shown in FIG. 7a, the current source 510 provides a steady state voltage level (i.e., 10 volts). This voltage is regulated by voltage regulator 460 to provide a supply (i.e., 5 volts) for the circuit components within the heading sensor located on the hybrid 48. When the clock 520 pulses, it triggers one shot 530 which activates the voltage clamp 540 and 550. The ten volt potential is momentarily clamped to 5 volts as shown at $T_1$ in FIG. 7a. This triggers the threshold detector 450 which in turns triggers the one shot 400. As mentioned above, the one shot 400 provides a corresponding pulse to the down-counter 380 signaling it to count down one count. The one shot 400 also provides a pulse to operate LED 30. The pulse to the light emitting diode is shown in FIG. 7b at $T_1$. The light emitting diode 30 therefore pulsates at the clock rate. This pulsating operation minimizes power consumption and allows the photosensors to react only to an AC signal.

Returning to FIG. 7a, when the down-counter 380 has counted down to zero, line 62 goes high causing the one shot 420 to provide a pulse to the clamp 430. The clamp 430 further reduces the line voltage from the 5 volt clock level to 0 volts. This is shown in FIG. 7a at $T_3$. Note that the light emitting diode 30 was triggered on the occurrence of a clock pulse at $T_2$. The output of the one shot 410 signals the down-counter 380 to load new data while signaling the nine bit latch 570 to hold the count stored in the nine bit up-counter 590 via the comparator 560. The output data is now in the latch 570.

Thus, a heading sensor for towed sonar arrays has been described which is approximately 0.65 inches in diameter and 1.8 inches in length. Despite the small size of the sensor, it has an accuracy on the order of of 1° of arc. While the invention has been described with reference to particular materials for the construction of various mechanical components, the invention is not limited thereto. For example, the light emitting diode 30 may be replaced by another suitable light source, i.e., laser diode. The invention is similarly not limited to the masking arangement on the wheel 10 relative to that on the diode array 54. Other suitable designs may be employed without departing from the scope of the invention. A Gray code may be used instead of the straight binary code shown in drawings.

In addition, the invention is not limited to particular electronics used to read the photosensitive array and provide an electrical signal corresponding to the position of wheel 10. With access to the teachings of this invention, it may be obvious to one of ordinary skill in the art to provide this function with a circuit of another design. In addition, other photosensitive materials may be utilized in place cadmium sulfide. It is contemplated by the appended claims to cover any these and any other such modifications.

What is claimed is:

1. An orientation detection system for providing electrical signals corresponding to the orientation of the system relative to a fixed frame of reference, comprising:
 (A) first means for providing a beam of light energy;
 (B) second means responsive to a magnetic field for varying, as a function of said orientation, the direction of the beam of light energy, said second means including a rotatable magnetic wheel having a reflective perimeter illuminated by said provided beam, said first means being disposed laterally of said perimeter; and
 (C) third means, responsive to said variably-directed light beam, for measuring the change of direction of the light beam and providing electrical signals corresponding to the orientation of the system within the magnetic field, said third means including a detector surface having both a first dimension extending generally longitudinal to the directional variations of said beam and a second dimension extending generally transverse to said variations, said detector surface being oriented (i) with its first dimension disposed generally parallel to the axis of said beam as laterally extending between said first means and said perimeter and (ii) with its second dimension disposed generally parallel to said axis of rotation.

2. The system of claim 1 wherein said first means includes means for providing a beam of pulsating light energy.

3. The system of claim 1 wherein the reflective perimeter of said wheel includes a plurality of reflective facets.

4. The system of claim 3 wherein said facets have a reflective coding to reflect a unique pattern of light to identify each facet.

5. The system of claim 4 wherein said wheel includes 12 facets.

6. The system of claim 1 wherein said first and second means are mounted within a first container and said third means is mounted at least partially within said first container to provide an internal assembly.

7. The system of claim 6 wherein said second means includes a reflective interior surface within said internal assembly.

8. The system of claim 7 wherein said third means includes means for detecting light to provide first electrical signals and electronic means for decoding said electrical signals to provide a count.

9. The system of claim 8 wherein said means for detecting light includes an array of photodetectors.

10. The system of claim 9 wherein said array of photodetectors is masked to detect which facet is being illuminated by said first means.

11. The system of claim 10 further including means for detecting the position of the facet to within 1° of arc.

12. The system of claim 11 wherein said photodetector array includes cadmium sulfide.

13. The system of claim 8 wherein said first container is filled with mineral oil.

14. The system of claim 13 wherein said internal assembly is contained within said first container which is less than 1 inch in diameter and less than 2 inches in length.

15. The system of claim 14 wherein said internal assembly is mounted for independent movement relative to said first container.

16. The system of claim 15 wherein said first container includes means for maintaining said internal assembly in an upright position.

17. The system of claim 16 wherein said electronic decoding means includes means for storing the count corresponding to the illumination pattern on the photodetector array.

18. The system of claim 17 including means for providing an electrical output whenever said count is reached.

19. The system of claim 18 including means for resolving ambiguity between the simultaneous detection by adjacent elements on said photosensitive array.

20. A heating sensor for towed sonar arrays for providing electrical signals corresponding to the heading of the array comprising:
 first means for providing a pulsating beam of light energy;
 second means responsive to a magnetic field for changing the direction of the light beam, said second means including a magnetic wheel having a plurality of reflective facets about its perimeter; and
 third means for measuring the change in direction of the light beam and providing electrical signals corresponding to the orientation of the system within the magnetic field, said third means including an array of photodetectors and electronic circuit means for ascertaining the pattern of illumination on said photodetectors and providing a corresponding electrical output.

21. The system of claim 20 wherein said first means, said second means, the array and part of the electrical circuit of said third means which comprises an internal assembly, is included within a first container.

22. The system of claim 21 wherein said internal assembly is mounted within said first container for relative rotational movement such that said internal assembly is maintained in an upright position.

23. The system of claim 22 wherein the facets of said wheel have a coded reflective pattern thereon.

24. The system of claim 23 wherein said second means includes a curved reflective interior wall within said internal assembly.

25. The system of claim 24 wherein said photodetector array is masked to facilitate the electronic detection of which facet is reflecting light and the position of said facet to within one degree of arc.

26. The system of claim 1 in which said detection surface is substantially planar.

27. An orientation detection system for providing electrical signals corresponding to the orientation of the system relative to a fixed frame of reference, comprising:
 (A) first means for providing a beam of light energy;
 (B) second means responsive to a magnetic field for varying, as a function of said orientation, the direction of the light beam, said second means including a rotatable magnetic wheel having a reflective perimeter illuminated by said provided beam, said first means being disposed laterally of said perimeter, the rotatably-swept reflection of said beam from said perimeter establishing a beam projection pattern;
 (C) a mirrored surface having a semi-parabolic curvature, illuminated by the provided beam as reflected from said wheel perimeter, for reflecting the beam projection pattern; and
 (D) third means, responsive to the beam pattern, for measuring the change of direction of the light beam and providing electrical signals corresponding to the orientation of the system within the magnetic field.

28. An orientation detection system for providing electrical signals corresponding to the orientation of the system relative to a fixed frame of reference, comprising:
 (A) first means for providing a beam of light energy;
 (B) second means responsive to a magnetic field for varying, as a function of said orientation, the direction of the light beam, said second means including a rotatable magnetic wheel having a reflective perimeter comprised of a plurality of facets and illuminated by said provided beam, said first means being disposed laterally of said perimeter; and
 (C) third means, responsive to said variably-directed light beam, for measuring the change of direction of the light beam and providing electrical signals corresponding to the orientation of the system within the magnetic field, said third means having a detection surface illuminated by said variable beam; where
 (D) predetermined first portions of each of said facets carry a uniquely-coded masking for selectively interrupting predetermined first portions of said reflected beam, while predetermined second portions of each facet remain unmasked so that predetermined second portions of said beam are reflected and swept by each of said facets, said first and second portions of each facet being axially disposed in substantially the same position as those of each of the other facets; and where
 (E) said detection surface of said third means is conjunctively configured so as to simultaneously detect both (i) the codedly interrupted reflections from said first portions of each of said facets and (ii) the swept second beam portions uninterruptedly reflected by each of said facets, said third means thereby simultaneously providing both coarse and fine-level detection of the angular orientation of said faceted wheel.

29. An orientation detection system for providing electrical signals corresponding to the orientation of the system relative to a fixed frame of reference, comprising:
(A) first means for providing a beam of light energy;
(B) second means responsive to a magnetic field for varying, as a function of said orientation, the direction of the light beam, said second means including a rotatable magnetic wheel having a reflective perimeter illuminated by said provided beam, said first means being disposed laterally of said perimeter, the rotatably-swept reflection of said beam from said perimeter establishing a beam projection pattern;
(C) a mirrored surface having a semi-parabolic curvature, illuminated by the provided beam is reflected from said wheel perimeter, for reflecting the beam projection pattern; and
(D) third means, responsive to the beam pattern, for measuring the change of direction of the light beam and providing electrical signals corresponding to the orientation of the system within the magnetic field, said third means including a detector surface having both a first dimension extending generally longitudinal to the directional variations of said beam and a second dimension extending generally transverse to said variations, said detector surface being oriented (i) with its first dimension disposed generally parallel to the axis of said beam as laterally extending between said first means and said perimeter and (ii) with its second dimension disposed generally parallel to said axis of rotation.

30. An orientation detection system for providing electrical signals corresponding to the orientation of the system relative to a fixed frame of reference, comprising:
(A) first means for providing a beam of light energy;
(B) second means responsive to a magnetic field for varying, as a function of said orientation, the direction of the light beam, said second means including a rotatable magnetic wheel having a reflective perimeter comprised of a plurality of facets and illuminated by said provided beam, said first means being disposed laterally of said perimeter; and
(C) third means, responsive to said variably-directed light beam, for measuring the change of direction of the light beam and providing electrical signals corresponding to the orientation of the system within the magnetic field, said third means including a detector surface having both a first dimension extending generally longitudinal to the directional variations of said beam and a second dimension extending generally transverse to said variations, said detector surface being oriented (i) with its first dimension disposed generally parallel to the axis of said beam as laterally extending between said first means and said perimeter and (ii) with its second dimension disposed generally parallel to said axis of rotation; where
(D) predetermined first portions of each of said facets carry a uniquely-coded masking for selectively interrupting predetermined first portions of said reflected beam, while predetermined second portions of each facet remain unmasked so that predetermined second portions of said beam are reflected and swept by each of said facets, said first and second portions of each facet being axially disposed in substantially the same positions as those of each of the other facets; and where
(E) said detection surface of said third means is conjunctively configured so as to simultaneously detect both (i) the codedly interrupted reflections from said first portions of each of said facets and (ii) the swept second beam portions uninterruptedly reflected by each of said facets, said third means thereby simultaneously providing both coarse and fine-level detection of the angular orientation of said faceted wheel.

31. An orientation detection system for providing electrical signals corresponding to the orientation of the system relative to a fixed frame of references, comprising:
(A) first means for providing a beam of light energy;
(B) second means responsive to a magnetic field for varying, as a function of said orientation, the direction of the light beam, said second means including a rotatable magnetic wheel having a reflective perimeter comprised of a plurality of facets and illuminated by said provided beam, said first means being disposed laterally of said perimeter, the rotatably-swept reflection of said beam from said perimeter establishing a beam projection pattern;
(C) a mirrored surface having a semi-parabolic curvature, illuminated by the provided beam as reflected from said wheel perimeter, for reflecting the beam projection pattern; and
(D) third means, responsive to the beam pattern, for measuring the change of direction of the light beam and providing electrical signals corresponding to the orientation of the system within the magnetic field, said third means including a detector surface having both a first dimension extending generally longitudinal to the directional variations of said beam and a second dimension extending generally transverse to said variations, said detector surface being oriented (i) with its first dimension disposed generally parallel to the axis of said beam as laterally extending between said first means and said perimeter and (ii) with its second dimension disposed generally parallel to said axis of rotation; where
(E) predetermined first portions of each of said facets carry a uniquely-coded masking for selectively interrupting predetermined first portions of said reflected beam, while predetermined second portions of each facet remain unmasked so that predetermined second portions of said beam are reflected and swept by each of said facets, said first and second portions of each facet being axially disposed in substantially the same position as those of each of the other facets; and where
(F) said detector surface of said third means is conjunctively configured so as to simultaneously detect both (i) the codedly interrupted reflections from said first portions of each of said facets and (ii) the swept second beam portions uninterruptedly reflected by each of said facets, said third means thereby simultaneously providing both coarse and fine-level detection of the angular orientation of said faceted wheel.

32. A system for detecting the angular orientation of an element which rotates relative to the system, this system comprising:
(A) first means for providing a beam of light energy;

(B) second means, cooperating with said rotatable element and responsive to said provided beam, for radially projecting said beam away from said rotatable element such that the transverse angular orientation of said beam with respect to said element's axis of rotation is a function of the corresponding angular orientation of the rotatable element itself, with the rotatably-swept extent of said projected beam establishing a projection pattern;

(C) a mirrored surface having a semi-parabolic curvature, illuminated by the provided beam as reflected from said wheel perimeter, for reflecting the beam pattern; and (D) third means, illuminated by the beam and having a cross-circumferentially disposed detector surface on which is established a projection pattern, said third means detecting the position of said beam within said pattern, said detected position being indicative of the angular orientation of said rotatable element.

33. A system according to claim 32 in which: said detection surface is substantially planar.

34. A system according to claim 32 in which:
(A) said rotatable element includes a wheel;
(B) said second means includes a plurality of mirrored facets disposed around the perimeter of said wheel; and
(C) (1) the beam provided by said first means is collimated and vertically oriented; and
(2) said first means is disposed laterally of said faceted wheel so as to direct said beam toward said wheel for offset reflection from the successive facets, with said offset reflection thereby comprising said beam projection.

35. A system according to claim 34 in which:
(A) predetermined first portions of each of said facets carry a uniquely-coded masking for selectively interrupting predetermined first portions of said reflected beam, while predetermined second portions of each facet remain unmasked so that predetermined second portions of said beam are reflected and swept by each of said facets, said first and second portions of each facet being axially disposed in substantially the same position as those of each of the other facets; and
(B) said detection surface of said third means is conjunctively configured so as to simultaneously detect both (i) the codedly interrupted reflections from said first portions of each of said facets and (ii) the swept second beam portions uninterruptedly reflected by each of said facets, said third means thereby simultaneously providing both coarse and fine-level detection of the angular orientation of said rotatable element.

36. A system according to claim 35 in which:

(A) the detection surface of said third means includes an integrated photodetector array which is substantially planar; and
(B) said first and second facet portions include alternately interspersed segments of each subject facet, and said detector array includes companionly interspersed unmasked and codedly masked detection lines disposed longitudinal to the effectuated scan motion.

37. A system according to claim 36 in which:
(A) said coded masking of said companion detection lines of said array includes a countably-sequenced masking;
(B) a given sweep of said uninterrupted second beam portions along said countably-coded lines produces a countably-sequenced composite pulse pattern;
(C) a given companion sweep of said selectively-interrupted first beam portions across said companion unmasked lines of said array produces a companion block composite pulse pattern; and
(D) said system includes means for companionly decoding said sequenced pattern and said block pattern so as to provide a compound indication of the precise angular orientation of said rotatable element.

38. A system according to claim 34 further including a solid internal assembly comprised of a light-transmissive material, said assembly having;
(A) means defining a volumetric rotational receptacle, said wheel being rotatably mounted within said receptacle;
(B) means defining a volumetric light-source receptacle, said first means being mounted within said source receptacle; and
(C) first and second boundary surfaces, said alteration surface being mounted at said first boundary surface and said detection surface being mounted on said second boundary surface.

39. A system according to claim 38 in which:
(A) said internal assembly is longitudinally configured with respect to the beam directed toward said facets from said first means;
(B) said system includes a longitudinally extended canister adapted to spacedly receive said internal assembly;
(C) said internal assembly is mounted for independent axially rotatable movement relative to said canister; and
(D) the space between said wheel and said receptacle and between said internal assembly and said canister is substantially filled with a damping liquid.

40. A system according to claim 34 in which said wheel is radially magnetized.

41. A system according to claim 34 in which:
the disposition of said facets around said wheel is substantially contiguous and equilaterally tangential.

* * * * *